United States Patent
Masaoka et al.

(12)

(10) Patent No.: US 6,569,980 B1
(45) Date of Patent: May 27, 2003

(54) CURABLE RESIN COMPOSITIONS

(75) Inventors: Yoshiteru Masaoka, Hyogo (JP); Atsushi Fukunaga, Hyogo (JP); Hiroshi Ando, Hyogo (JP); Fumio Kawakubo, Hyogo (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/926,187

(22) PCT Filed: Mar. 22, 2000

(86) PCT No.: PCT/JP00/01749
§ 371 (c)(1),
(2), (4) Date: Sep. 20, 2001

(87) PCT Pub. No.: WO00/56818
PCT Pub. Date: Sep. 28, 2000

(30) Foreign Application Priority Data

Mar. 23, 1999 (JP) ............................................. 11-078111

(51) Int. Cl.$^7$ ............................................. C08G 77/26
(52) U.S. Cl. .............................. 528/27; 528/34; 528/38
(58) Field of Search ................................ 528/38, 27, 34

(56) References Cited

U.S. PATENT DOCUMENTS

| | | | | |
|---|---|---|---|---|
| 4,657,986 A | * | 4/1987 | Isayama et al. | 525/407 |
| 4,981,728 A | * | 1/1991 | Homma et al. | 427/386 |
| 5,373,042 A | * | 12/1994 | Bride et al. | 524/230 |
| 5,399,601 A | * | 3/1995 | Kusumi et al. | 524/188 |
| 5,500,464 A | * | 3/1996 | Homma et al. | 523/435 |
| 5,541,266 A | * | 7/1996 | Hasegawa et al. | 525/403 |
| 5,639,825 A | * | 6/1997 | Nanbu et al. | 525/100 |
| 6,020,446 A | * | 2/2000 | Okamoto et al. | 526/279 |

FOREIGN PATENT DOCUMENTS

| | | |
|---|---|---|
| EP | 0 184 829 A | 6/1986 |
| EP | 0 333 222 A | 9/1989 |
| EP | 0 370 464 A | 5/1990 |
| EP | 1 099 728 A1 | 5/2001 |
| WO | WO 92 22609 A | 12/1992 |

OTHER PUBLICATIONS

Patent Abstracts of Japan vol. 012, No. 426 (C–542), Nov. 10, 1988 & JP 63 156867 A (Yokohama Robber Co., Ltd: The), Jun. 29, 1988 *Abstract*.

Patent Abstracts of Japan vol. 004, No. 061 (C–009), May 8, 1980 & JP 55 027362 a (Japan Atom Energy Res Inst; Others: 01), Feb. 27, 1980 *Abstract*.

Patent Abstracts of Japan vol. 011, No. 394 (C–465), Dec. 23, 1987 & JP 62 153356 A (Yokohama Robber Co Ltd: The), Jul. 8, 1987 *Abstract*.

* cited by examiner

Primary Examiner—Margaret G. Moore
(74) Attorney, Agent, or Firm—Armstrong, Westerman & Hattori, LLP

(57) ABSTRACT

To provide curable resin compositions capable of exhibiting a low modulus, a high break strength, a high elongation and a satisfactory water-resistant adhesiveness to mortar. One of which includes (a) an organic polymer having at least one reactive silicon group in one molecule, (b) an amino group-substituted silane compound, and (c) an epoxy group-substituted silane compound; and another of which includes (a) an organic polymer having at least one reactive silicon group in one molecule, (b) an amino group-substituted silane compound, (c) an epoxy group-substituted silane compound, and (d) an epoxy resin.

8 Claims, No Drawings

CURABLE RESIN COMPOSITIONS

TECHNICAL FIELD

The present invention relates to curable resin compositions containing an organic polymer having a reactive silicon group.

BACKGROUND OF THE INVENTION

The reactive silicon group is a group having a silicon atom to which hydroxyl group or a hydrolyzable group is bonded (hereinafter, referred to as "reactive silicon group"), and has a property capable of forming a siloxane bond in the presence of moisture or the like to form a crosslinkage.

The organic polymer having the reactive silicon group has an interesting property that the polymer is cured by the action of moisture in air or the like to form a rubbery cured product or the like. Therefore, this polymer has been used as sealants or adhesives.

Hitherto, a number of porous base materials such as mortar, concrete and ALC are employed as the materials to be adhered in the field of sealants and adhesives, and a strong adhesion to these porous materials is known to be difficult. For this reason, a method of applying a primer is used in most cases. However, especially when the adhesion interface is wetted by rain or water spraying after the application, the adhesiveness is lowered by the invasion of water from the porous part, whereby adhesion interfacial failure frequently occurs owing to the movement or vibration at joint parts or adhered parts. Japanese Patent Publication No. 28177/1987 tried to solve the problem but the method results in only unsatisfactory water-resistant adhesiveness to mortar.

Furthermore, in recent years, especially in the situation that the durability of buildings is extended, as sealants or adhesives enduring the movement at joint parts or adhered parts over a long period of time, preferred is a material which exhibits a low modulus, a high elongation, and a high break strength though modulus is generally required to some extent, and furthermore, needed is a material which is sufficiently excellent in adhering ability to a base material rather than in break strength under not only the condition that a treated material is not immersed in water but also the condition that it is immersed in water.

Under the circumstances, various investigations have been carried out for enhancing the adhesiveness. For example, Japanese Patent Publication No. 40782/1983 describes examples of amino group-substituted silane compounds and epoxy-group substituted silane compounds as adhesiveness-imparting agents for an organic polymer having a reactive silane group or the addition of two or more of them, but a combined use of the amino group-substituted silane compound and the epoxy-group substituted silane compound is not specifically described, and the effect is not described, too. Japanese Patent Publication No. 31726/1991 also describes an epoxy resin and the addition of an amino group-substituted silane compound or an epoxy-group substituted silane compound as an adhesiveness-imparting agent, but there is no specific description of a combined use of the amino group-substituted silane compound, the epoxy-group substituted silane compound and an epoxy resin as adhesiveness-imparting agents, and also the effect is not described. On the other hand, Japanese Patent Publication No. 28177/1987 describes the improvement of adhesiveness resulted from the addition of a product obtained by reacting an epoxy resin, an amino group-substituted silane compound and an epoxy-group substituted silane compound beforehand, but it is not described to add them independently without conducting a reaction beforehand, and the effect is not described, too. Moreover, Japanese Patent Publication No. 35421/1987 describes the addition of a product obtained by reacting an amino group-substituted silane compound and an epoxy-group substituted silane compound beforehand as an adhesiveness-imparting agent, but there is no description of the independent addition of the amino group-substituted silane compound and the epoxy-group substituted silane compound without conducting a reaction beforehand, and also the effect is not described.

The present invention is to provide a curable resin composition containing an organic polymer having a reactive silicon group, which is capable of exhibiting a low modulus, a high break strength, a high elongation and a good water-resistant adhesiveness to mortar.

DISCLOSURE OF THE INVENTION

As a result of the extensive studies for solving the above problems, the present inventors have found that a curable resin composition exhibiting an excellent water-resistant adhesiveness to mortar is surprisingly obtained in the case that specific two or three kinds of adhesiveness-imparting agents are added without conducting a reaction beforehand as compared with the case of adding the agents reacted beforehand, and have accomplished the invention.

Namely, the first of the invention relates to a curable resin composition which comprises (a) an organic polymer having at least one reactive silicon group in one molecule, (b) an amino group-substituted silane compound, and (c) an epoxy group-substituted silane compound.

Moreover, the second of the invention relates to a curable resin composition which comprises (a) an organic polymer having at least one reactive silicon group in one molecule, (b) an amino group-substituted silane compound, (c) an epoxy group-substituted silane compound, and (d) an epoxy resin.

BEST MODE FOR CARRYING OUT THE INVENTION

The main chain skeleton of the organic polymer (a) having at least one reactive silicon group in one molecule for use in the invention is not particularly limited, and the polymers having various main chain skeletons can be used.

Specifically, examples thereof include polyoxyalkylene polymers such as polyoxyethylene, polyoxypropylene, polyoxybutylene, polyoxytetramethylene, polyoxyethylene/polyoxypropylene copolymer, and polyoxypropylene/polyoxybutylene copolymer; hydrocarbon polymers such as ethylene/propylene copolymer, polyisobutylene, isobutylene/isoprene copolymer, polychloroprene, polyisoprene, isoprene or butadiene/acrylonitrile and/or styrene copolymer, polybutadiene, isoprene or butadiene/acrylonitrile, and/or styrene copolymer, and hydrogenated polyolefin polymers obtained by hydrogenating these polyolefin polymers; polyester polymers obtained by the condensation of dibasic acids such as adipic acid with glycols or by the ring-opening polymerization of lactones; acrylate ester polymers such as polyacrylate esters obtained by the radical polymerization of monomers such as ethyl acrylate and butyl acrylate and acrylate ester copolymers of acrylate esters such as ethyl acrylate and butyl acrylate with vinyl acetate, acrylonitrile, methyl methacrylate or styrene; graft polymers obtained by the polymerization of a vinyl monomer in the above organic polymers; polysulfide polymers;

polyamide polymers such as nylon 6 obtained by the ring-opening polymerization of ε-caprolactam, nylon 6,6 obtained by the polycondensation of hexamethylenediamine with adipic acid, nylon 6,10 obtained by the polycondensation of hexamethylenediamine with sebacic acid, nylon 11 obtained by the polycondensation of ε-aminoundecanoic acid, nylon 12 obtained by the ring-opening polymerization of ε-aminolaurolactam, and nylon copolymers having two or more components selected from the above nylons; polycarbonate polymers obtained by, for example, the polycondensation of bisphenol A with carbonyl chloride; diallylphthalate polymers; and the like. Among the polymers having the above main chain structures, preferred are polyester polymers, acrylate ester polymers, acrylate ester copolymers, polyoxyalkylene polymers, hydrocarbon polymers, polycarbonate polymers, and the like. Moreover, particularly preferred are polyoxyalkylene polymers essentially having a repeating unit represented by the general formula (1):

$$—R^1—O—\tag{1}$$

(wherein $R^1$ represents a divalent organic group which is preferably a linear or branched alkylene group having 1 to 14 carbon atoms), since these polymers have relatively low glass transition temperatures and afford cured products having excellent cold resistance.

$R^1$ in the general formula (1) is preferably a linear or branched alkylene group having 1 to 14, more preferably 2 to 4, carbon atoms. Specific examples of the repeating unit represented by the general formula (1) include the following.

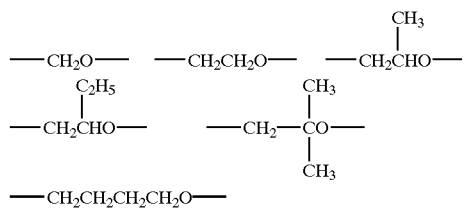

The main chain skeleton of the polyoxyalkylene polymer may consist of either one repeating unit or two or more repeating units. In the particular case that the curable resin composition is used as a sealant or the like, it is preferable to contain a polymer having oxypropylene as the main component.

As the synthetic method of the polyoxyalkylene polymers, there are mentioned, for example, a polymerization method with the use of an alkali catalyst such as KOH, a polymerization method with the use of an organoaluminum-porphyrin complex catalyst obtained by reacting an organoaluminum compound with porphyrin as shown in Japanese Patent Laid-Open No. 215623/1986, a polymerization method with the use of a double metal cyanide complex catalyst as shown in, for example, Japanese Patent Publication Nos. 27250/1971 and 15336/1984, but the invention is not restricted thereto.

The main chain skeleton of the above oxyalkylene polymer may contain other components such as a urethane-binding component so long as the characteristics of the oxyalkylene polymer are not seriously damaged thereby.

The above urethane binding component is not particularly restricted but includes, for example, those obtained by reacting aromatic polyisocyanates such as toluene (tolylene) diisocyanate, diphenylmethane diisocyanate and xylylene diisocyanate; or aliphatic polyisocyanates such as isophorone diisocyanate and hexamethylene diisocyanate with polyols having the repeating unit of the above general formula (1).

The reactive silicon group contained in the component (a) is a group which has hydroxyl group or a hydrolyzable group bonded to a silicon atom and can be crosslinked through the formation of a siloxane bond. Typical example thereof is a group represented by the following general formula (2):

(wherein $R^2$ and $R^3$ each represents an alkyl group having 1 to 20 carbon atoms, a cycloalkyl group having 3 to 20 carbon atoms, an aryl group having 6 to 20 carbon atoms, an aralkyl group having 7 to 20 carbon atoms or a triorganosiloxy group represented by $R^4{}_3SiO—$ ($R^4$ is an alkyl group, a cycloalkyl group, an aryl group, or an aralkyl group similar to $R^2$ and $R^3$, and three $R^4$'s may be the same or different), and in case that two or more $R^2$'s or $R^3$'s are present, they may be the same or different. X represents hydroxyl group or a hydrolyzable group, and in case that two or more X's are present, they may be the same or different, a represents 0, 1 or 2 and b represents 0, 1, 2 or 3. a's in p pieces of the general formula (3):

are not necessarily identical. p represents an integer of 0 to 19. Provided that the relation (the sum of a's)+b≧1 is satisfied.).

The hydrolyzable group represented by the above X may be a conventionally known hydrolyzable group without particular restriction. Specifically, examples thereof include hydrogen atom, halogen atoms, alkoxy groups, acyloxy groups, ketoxymate groups, amino groups, amido groups, acid amido groups, aminooxy groups, mercapto group, alkenyloxy groups, and the like. Among these groups, preferred are hydrogen atom, alkoxy groups, acyloxy groups, ketoxymate groups, amino groups, amido groups, aminooxy groups, mercapto group and alkenyloxy groups in view of their mild hydrolyzability and convenience in handling.

One to three hydrolyzable groups or hydroxyl groups can be bonded to one silicon atom. The value "(the sum of a's)+b" preferably ranges from 1 to 5. When the reactive silicon group carries two or more hydroxyl groups or hydrolyzable groups, these groups may be the same or different.

The reactive silicon group may have either one or more constituting silicon atoms. In the case of silicon atoms bonded through siloxane bonds or the like, the reactive silicon group may carry about 20 silicon atoms.

A reactive silicon group represented by the general formula (4):

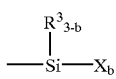

(4)

(wherein $R^3$, X and b each is as defined above) is preferable from the viewpoint of easy availability.

Specific examples of $R^2$ and $R^3$ in the above general formulae (3) and (4) include alkyl groups such as methyl group and ethyl group; cycloalkyl groups such as cyclohexyl group; aryl groups such as phenyl group; aralkyl groups such as benzyl group; and triorganosiloxy groups represented by $R^4{}_3SiO$— wherein $R^4$ represents methyl group, phenyl group or the like; and the like. Among these groups, methyl group is preferable. As the specific structure of the reactive silicon group, particularly preferred are trimethoxysilyl group, methyldimethoxysilyl group, triethoxysilyl group and methyldiethoxysilyl group. The reactive silicon group may be employed singly or in combination of two or more of them.

The reactive silicon group may be present at either the main chain or the side chains, but it is preferably present at the ends of the side chains.

The reactive silicon group may be introduced by known methods. That is, the following methods are mentioned.

(A) An organic polymer having a functional group such as hydroxyl group in the molecule is reacted with an organic compound having an active group reactive to the functional group and an unsaturated group to obtain an organic polymer having the unsaturated group. Alternatively, an organic polymer having an unsaturated group is obtained by the copolymerization with an unsaturated group-containing epoxy compound. Next, the reaction product thus obtained is treated with a hydrosilane having a reactive silicon group to effect hydrosilylation.

(B) An organic polymer having an unsaturated group obtained in a similar manner to the method (A) is reacted with a compound having mercapto group and a reactive silicon group.

(C) An organic polymer having a functional group such as hydroxyl group, epoxy group, or isocyanate group in the molecule is reacted with a compound having a functional group reactive to the former functional group and a reactive silicon group. Among the above methods, it is preferable to use the method (A) or the method (C) wherein a polymer having hydroxyl group at the end is reacted with a compound having isocyanate group and a reactive silicon group.

The polymer of the component (a) may be a linear or branched one, and preferably has a number average molecular weight of about 500 to about 50,000, more preferably 1,000 to 30,000. Preferably, this polymer contains at least one, preferably 1.1 to 5, reactive silicon groups in one molecule. When the polymer contains less than 1 reactive silicon group in the molecule, only insufficient curability may be achieved. When it contains an excessively large number of reactive silicon groups, the network structure thereof becomes too dense and thus good mechanical properties may not be exhibited.

Specific examples of the component (a) include those proposed in each publication of Japanese Patent Publication Nos. 36319/1970 and 12154/1971, Japanese Patent Laid-Open Nos. 156599/1975, 6096/1979, 13767/1980, 13468/1980, and 164123/1982, Japanese Patent Publication No. 2450/1991, U.S. Pat. Nos. 3,632,557, 4,345,053, 4,366,307, and 4,960,844; and oxyalkylene polymers having a high molecular weight and a narrow molecular weight distribution, i.e., having a number average molecular weight of 6,000 or more and Mw/Mn of 1.6 or less proposed in Japanese Patent Laid-Open Nos. 197631/1986, 215622/1986, 215623/1986, and 218632/1986, but the invention is not particularly restricted thereto.

The above organic polymer having a reactive silicon group may be employed singly or in combination of two or more of them. It is also possible to use an organic polymer formed by blending a vinyl polymer having a reactive silicon group.

Processes for producing an organic polymer by blending a vinyl polymer having a reactive silicon group are proposed in Japanese Patent Laid-Open Nos. 122541/1984, 112642/1988, and 172631/1994. A preferable specific example is the method wherein a copolymer composed of an acrylate ester monomer unit and/or a methacrylate ester monomer unit having an alkyl group having 1 to 8 carbon atoms which carries a reactive silicon group and has a molecular chain substantially represented by the following general formula (5):

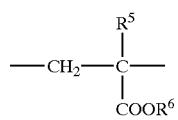

(5)

(wherein $R^5$ represents hydrogen atom or methyl group, and $R^6$ represents an alkyl group having 1 to 8 carbon atoms) and an acrylate ester monomer unit and/or an alkyl methacrylate monomer unit having an alkyl group having 10 or more carbon atoms represented by the following general formula (6):

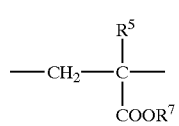

(6)

(wherein $R^5$ is as defined above, and $R^7$ represents an alkyl group having 10 or more carbon atoms) is blended with an organic polymer having a reactive silicon group.

Examples of the $R^6$ in the above general formula (5) include alkyl groups having 1 to 8, preferably 1 to 4 and still preferably 1 or 2, carbon atoms such as methyl group, ethyl group, propyl group, n-butyl group, t-butyl group and 2-ethylhexyl group. The alkyl group of $R^6$ may be either a single group or a mixture of two or more groups.

Examples of $R^7$ in the general formula (6) include long-chain alkyl groups having 10 or more, usually 10 to 30 and preferably 10 to 20, carbon atoms such as lauryl group, tridecyl group, cetyl group, stearyl group, and behenyl group. The alkyl group of $R^7$ may be either a single group or a mixture of two or more groups, similar to $R^6$.

The molecular chain of the vinyl copolymer substantially consists of the monomer units of the formulae (5) and (6). The term "substantially" as used herein means that the sum of the contents of the monomer units of the formulae (5) and (6) exceeds 50% by weight of the copolymer. The sum of the contents of the monomer units of the formulae (5) and (6) is preferably 70% by weight or more.

The weight ratio of the monomer unit of the formula (5) to the one of the formula (6) preferably ranges from 95:5 to 40:60, still preferably from 90:10 to 60:40.

Examples of monomer units which may be contained in the copolymer other than those represented by the formulae (5) and (6) include acrylic acids such as acrylic acid and methacrylic acid; amido group-containing monomers such as acrylamide, methacrylamide, N-methylolacrylamide, and N-methylolmethacrylamide, epoxy group-containing monomers such as glycidyl acrylate and glycidyl methacrylate, and amino group-containing monomers such as diethylaminoethyl acrylate, diethylaminoethyl methacrylate, and aminoethyl vinyl ether; and other monomer units derived from acrylonitrile, styrene, α-methylstyrene, alkyl vinyl ether, vinyl chloride, vinyl acetate, vinyl propionate, and ethylene.

It is preferable that the copolymer has a number average molecular weight of 500 to 100,000 from the viewpoint of convenience in handling.

The reactive silicon group which the copolymer carries is represented by the general formula (7):

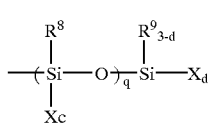

(7)

(wherein $R^8$ and $R^9$ each represents a substituted or unsubstituted monovalent organic group having 1 to 20 carbon atoms or a triorganosiloxy group (the detail of the organic group and the triorganosiloxy group are the same as the definition of the above $R^2$ and $R^3$); X represents hydroxyl group or a hydrolyzable group which may be the same or different; c is an integer of 0, 1 or 2; d is an integer of 0, 1, 2 or 3, provided that the relation: (the sum of c's)+d≧1 is satisfied; and q is an integer of from 0 to 19). From an economical viewpoint, the reactive silicon group is preferably represented by the general formula (8):

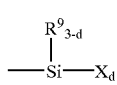

(8)

(wherein $R^9$, X and d each is as defined above).

For achieving a sufficient curability, it is preferable that the copolymer has at least 1, preferably at least 1.1 and still preferably at least 1.5, reactive silicon groups on average in one molecule.

Specific examples of the hydrolyzable group in the formula (7) include halogen atoms, hydrogen atom, alkoxy groups, acyloxy groups, ketoxymate groups, amino groups, amido groups, aminooxy groups, mercapto group, alkenyloxy groups, and the like. Among these groups, alkoxy groups such as methoxy group and ethoxy group are preferable because of the mild hydrolyzability.

Specific examples of $R^8$ and $R^9$ in the formula (7) include alkyl groups such as methyl group and ethyl group, cycloalkyl groups such as cyclohexyl group, aryl groups such as phenyl group, aralkyl groups such as benzyl group, and the like. Furthermore, the groups $R^8$ and $R^9$ each may be a triorganosiloxy group represented by $R^4_3SiO—$ (wherein $R^4$ is as defined above). Among them, methyl group is particularly preferable.

As another example of the process for producing an organic polymer formed by blending a vinyl polymer having a reactive silicon group, use may be made of a method wherein a (meth)acrylate ester monomer is polymerized in the presence of an organic polymer having a reactive silicon group. Although this method is disclosed in detail in each publication of Japanese Patent Laid-Open Nos. 78223/1984, 168014/1984, 228516/1985, and 228517/1985, but the invention is not restricted thereto.

The above amino group-substituted silane compound (b) means a compound having an amino group and a hydrolyzable silyl group in one molecule, and specific examples include γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-γ-aminopropylmethyldimethoxysilane, 1,3-diaminoisopropyltrimethoxysilane, and the like. However, the compound is not restricted thereto, and amino group-substituted silane compounds commonly employed are usable. These amino group-substituted silane compounds may be used singly or in combination of two or more of them.

Among the above amino group-substituted silane compounds, preferred are γ-aminopropylmethyldimethoxysilane, N-(β-aminoethyl)-γ-aminopropyltrimethoxysilane, and N-(β-aminoethyl)-γ-aminopropylmethyldimethoxysilane in view of the easy availability. Furthermore, those having two or more amino groups are particularly preferable because of exhibiting a high adhesiveness. With regard to the amount to be added, since two much addition of the compound results in a high modulus and too little addition lowers the adhesiveness, the compound is added in an amount of preferably 0.1 to 15 parts by weight, more preferably 0.5 to 10 parts by weight, relative to 100 parts by weight of the organic polymer containing a reactive silicon group.

The above epoxy group-substituted silane compound (c) means a compound having an epoxy group and a hydrolyzable silyl group in one molecule, and specific examples include γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, and the like. However, the compound is not restricted thereto, and epoxy group-substituted silane compounds commonly employed are usable. These epoxy group-substituted silane compounds may be used singly or in combination of two or more of them.

Among the above epoxy group-substituted silane compounds, particularly preferred is γ-glycidoxypropylmethyldimethoxysilane in view of the easy availability. With regard to the amount to be added, since two much addition of the compound results in a high modulus and too little addition lowers the adhesiveness, the compound is added in an amount of preferably 0.1 to 15 parts by weight, more preferably 0.5 to 10 parts by weight, relative to 100 parts by weight of the organic polymer containing a reactive silicon group.

As the above epoxy resin (d), specific examples include fire retardant epoxy resins such as epichlorohydrin/bisphenol A-type epoxy resins, epichlorohydrin/bisphenol F-type epoxy resins and glycidyl ethers of tetrabromobisphenol A, novolak-type epoxy resins, hydrogenated bisphenol A-type epoxy resins, glycidyl ether-type epoxy resins of bisphenol A propylene oxide adduct, glycidyl ether p-oxybenzoate epoxy resins, m-aminophenol epoxy resins, diaminodiphenylmethane epoxy resins, urethane-modified epoxy resins, various alicyclic epoxy resins, N,N-glycidylaniline, N,N-diglycidyl-o-toluidine, triglycidyl isocyanurate, polyalkylene glycol diglycidyl ethers, glycidyl ethers of polyhydric alcohols such as glycerol, hydantoin-type epoxy resin, epoxidized unsaturated polymers such as petroleum resin, and the like. However, the resin is not restricted thereto and epoxy resins commonly employed are usable. These epoxy resins may be used singly or in combination of two or more of them.

Among the above epoxy resins, particularly preferred are those containing at least two epoxy groups in one molecule from the viewpoints that they exhibit a high reactivity at curing and the cured product can easily form a three-dimensional network. More preferred are bisphenol A-type epoxy resins, novolak-type epoxy resins, or the like. With regard to the amount to be added, since two much addition of the resin results in a high modulus and too little addition lowers the adhesiveness, the resin is added in an amount of preferably 0.1 to 15 parts by weight, more preferably 0.5 to 10 parts by weight, relative to 100 parts by weight of the organic polymer containing a reactive silicon group.

With regard to the total amount of the components (b), (c) and (d) to be added, because too much addition of them results in a high modulus and a high cost and too little addition lowers the adhesiveness and break strength, they are added in an amount of preferably 0.5 to 20 parts by weight, more preferably 1 to 15 parts by weight, relative to 100 parts by weight of the organic polymer containing a reactive silicon group.

As a combination of these adhesiveness-imparting agents, i.e., the components (b) and (c) or the components (b), (c) and (d), when a curable resin composition having a low modulus is desired, it is preferable to select components which result in a low crosslinking density, that is, components carrying a small number of the reacting groups on a silicon atom. Therefore, γ-aminopropylmethyldimethoxysilane or N-(β-aminoethyl)-γ-aminopropylmethyldimethoxysilane is selected as the component (b), γ-glycidoxypropylmethyldimethoxysilane as the component (c), and a bisphenol A-type epoxy resin as the component (d), and this combination is preferable. Alternatively, when a priority is adhesiveness, the components having many reactive groups on a silyl group are preferred. Therefore, γ-aminopropyltrimethoxysilane or N-(β-aminoethyl)-γ-aminopropyltrimethoxysilane is selected as the component (b), γ-glycidoxypropyltrimethoxysilane as the component (c), and a bisphenol A-type epoxy resin as the component (d), and this combination is preferable.

These components (b), (c) and (d) are added without conducting a reaction beforehand. To conduct a reaction beforehand herein means to react the amino group of the amino group-substituted silane compound with the epoxy group of the epoxy group-substituted silane compound or the epoxy resin before adding the components (b), (c) and (d) to the organic polymer containing a reactive silicone group. For example, in the case of reacting γ-aminopropyltrimethoxysilane with γ-glycidoxypropyltrimethoxysilane, a product of the reaction conducted beforehand can be obtained by stirring them at a high concentration condition, i.e., without solvent, at a temperature ranging from room temperature to 180° C. for 1 to 8 hours through the following reactions.

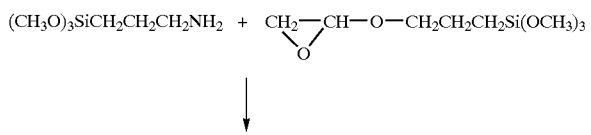

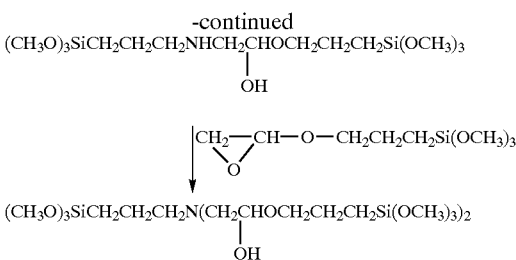

Furthermore, the composition of the invention may contain a silanol-condensing catalyst which accelerates the reaction of the reactive silicon group. Examples of such a silanol-condensing catalyst include titanate esters such as tetrabutyl titanate, tetrapropyl titanate, tetraisopropyl titanate, and titanium tetraacetylacetonate; organotin compounds such as dibutyltin dilaurate, dibutyltin maleate, dibutyltin diacetate, stannous octylate, stannous naphthenate, stannous stearate, stannous versatate, and reaction products of dibutyltin oxide with phthalate esters, and dibutyltin diacetylacetonate; organoaluminum compounds such as aluminum trisacetylacetonate, aluminum trisethylacetoacetate, and diisopropoxyaluminum ethylacetonate; products obtained by reacting bismuth salts such as bismuth-tris(2-ethylhexoate) and bismuth-tris (neodecanoate) with organic carboxylic acids or organic amines; chelate compounds such as zirconium tetraacetylacetonate and titanium tetraacetylacetonate; organolead compounds such as lead octylate; organoiron compounds such as iron naphthenate; and organovanadium compounds; amine compounds such as butylamine, octylamine, laurylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, and 1,8-diazabicyclo(5,4,0)undecene-7 (DBU), or carboxylic acid salts thereof; low-molecular weight polyamide resins obtained from polyamines in excess with polybasic acids; and products obtained by reacting polyamines in excess with epoxy compounds; and the like. However, the catalyst is not restricted thereto, and the condensing catalysts commonly used can be used. These silanol catalysts may be used singly or in combination of two or more of them. Among these silanol-condensing catalysts, organometallic compounds or combinations of organometallic compounds with amine compounds are preferable in view of curing property. Furthermore, dibutyltin maleate, reaction products of dibutyltin oxide with phthalate esters, and dibutyltin diacetylacetonate are preferable in view of the fast curing rate. Moreover, from the viewpoint of obtaining a curable resin composition having a high restoration rate, a combination of stannous dioctylate and laurylamine is preferable and it is particularly preferable to add 0.5 to 10 parts by weight of stannous dioctylate and 0.1 to 10 parts by weight of laurylamine relative to 100 parts by weight of the organic polymer containing a reactive silicon group.

In addition to the above components, the curable resin composition of the invention may contain, if needed, various additives such as fillers, plasticizers, anti-sagging agents, colorants, silane-coupling agents, epoxy curing agents, reinforcing resins, storage stability improvers, anti-aging agents, ultraviolet absorbers, metal-inactivating agents, anti-ozone degradation agents, photostabilizers, amine-based radical chain inhibitors, phosphorus-based peroxide decomposing agents, lubricating agents, pigments and foaming agents.

As the above fillers, use can be made of, for example, reinforcing fillers such as fumed silica, precipitated silica, silicic anhydride, hydrous silicic acid and carbon black; fillers such as calcium carbonate, magnesium carbonate, diatomaceous earth, calcined clay, clay, talc, kaolin, titanium oxide, bentonite, organic bentonite, ferric oxide, zinc oxide, active zinc white, glass balloon, Shirasu balloon, organic balloon, organic fibers, and inorganic fibers; and the like.

In the case of obtaining a cured product having a high strength by using these fillers, a preferable result can be achieved by using a filler selected mainly from fumed silica, precipitated silica, silicic anhydride, hydrous silicic acid and carbon black, surface-treated fine calcium carbonate, calcined clay, clay and active zinc white in an amount of 1 to 200 parts by weight relative to 100 parts by weight of the organic polymer (a). In the case of obtaining a cured product having a low strength and a large elongation, a preferable result can be achieved by using a filler selected mainly from titanium oxide, calcium carbonate, magnesium carbonate, talc, ferric oxide, zinc oxide and Shirasu balloon in an amount of 5 to 500 parts by weight relative to 100 parts weight of the organic polymer. Either one of these fillers or a mixture of two or more of them may be used.

The above plasticizers include phthalate esters such as diisodecyl phthalate, diundecyl phthalate, diisoundecyl phthalate, dioctyl phthalate, dibutyl phthalate, and butyl benzyl phthalate; aliphatic dibasic acid esters such as dioctyl adipate, isodecyl succinate, and dibutyl sebacate; glycol esters such as diethylene glycol dibenzoate and pentaerythritol ester; aliphatic esters such as butyl oleate and methyl acetylricinolate; phosphate esters such as tricresyl phosphate, trioctyl phosphate, and octyl diphenyl phosphate; epoxidated plasticizers such as epoxidated soybean oil, epoxidated linseed oil, and benzyl epoxystearate; polyester plasticizer such as polyesters of dibasic acids with dihydric alcohols; polyethers such as polypropylene glycol and derivatives thereof; polystyrenes such as poly-α-methylstyrene and polystyrene; polybutadiene, butadiene/acylonitrile copolymer, polychloroprene, polyisoprene, polyisobutene, paraffin-type hydrocarbons, naphthene-type hydrocarbons; paraffin/naphthene mixed hydrocarbons, chlorinated paraffins, and the like, and they may be optionally used singly or as a mixture of two or more of them. In particular, preferred are polyether plasticizer such as polypropylene glycol and derivatives thereof, polyisobutene, paraffins, and the like which have no unsaturated bond in the main chain of the polymer in view of weatherability. Moreover, it is preferable to use, as a polyether plasticizer, a polyoxyalkylene obtainable by introducing organic groups into 50% or more of the molecular chain ends of a polyoxyalkylene polyol in view of paint antifouling property. Furthermore, an allyl group-terminated polyoxypropylene obtainable by introducing allyl groups into 80% or more of the molecular chain ends as organic groups is particularly preferable in view of water-resistant adhesiveness to mortar.

The combination of these plasticizers and fillers enables the enlargement of elongation of the cured products and also enables the incorporation of a large amount of fillers. Therefore, the combination is effective.

Examples of the anti-sagging agents include hydrogenated castor oil derivatives; polyamide wax; and metal soaps such as calcium stearate, aluminum stearate and barium stearate. These anti-sagging agents may be optionally used, depending on the purpose of the use or in case of being needed owing to the addition of fillers, reinforcing agents, or the like.

As the above colorants, conventional inorganic pigments, organic pigments and dyes may be used, if needed.

Specific examples of the above silane-coupling agents include mercapto group-containing silanes such as γ-mercaptopropyltrimethoxysilane and γ-mercaptopropyldimethoxysilane; vinyl-type unsaturated group-containing silanes such as vinyltrimethoxysilane, vinyltriethoxysilane, γ-methacryloyloxypropyltrimethoxysilane, and γ-acryloyloxypropylmethyldimethoxysilane; chlorine atom-containing silanes such as γ-chloropropyltrimethoxysilane; isocyanate-containing silanes such as γ-isocyanatopropyltriethoxysilane and γ-isocyanatopropylmethyldimethoxysilane; hydrosilanes such as methyldimethoxysilane, trimethoxysilane, and methyldiethoxysilane; and the like, but the agent is not restricted thereto.

Curing agents of the above epoxy resins include amine compounds and ketimine compounds. Specific examples of the amine compounds include butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5,4,0)undecene-7 (DBU), and the like. However, the compound is not restricted thereto and amine compounds commonly employed are usable. These amine compounds may be used singly or in combination of two or more of them.

Examples of the above ketimine compounds include compounds represented by the following general formula (9):

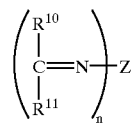

(9)

(wherein $R^{10}$ and $R^{11}$ each independently represents hydrogen atom, an alkyl group having 1 to 6 carbon atoms or phenyl group; Z represents an organic group; and n represents 1, 2 or 3), and the compound can be obtained by a condensation reaction between an amine compound with a carbonyl compound.

For synthesizing the ketimine compounds, known amine compounds and carbonyl compounds may be used. As the amine compounds, use can be made of, for example, diamines such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phenylenediamine, and p,p'-biphenylenediamine; polyvalent amines such as 1,2,3-triaminopropane, triaminobenzene, tris(2-aminoethyl)amine, and tetra(aminomethyl)methane; polyalkylenepolyamines such as diethylenetriamine, triethylenetriamine, and tetraethylenepentamine; polyoxyalkylene polyamines; and the like. As the carbonyl compounds, use can be made of, for example, aldehydes such as acetaldehyde, propionaldehyde, n-butylaldehyde, isobutylaldehyde, diethylacetaldehyde, glyoxal, and benzaldehyde; cyclic ketones such as cyclopentanone, trimethylcyclopentanone, cyclohexanone, and trimethylcyclohexanone; aliphatic ketones such as acetone, methyl ethyl ketone, methyl propyl ketone, methyl isopropyl ketone, methyl isobutyl ketone, diethyl ketone, dipropyl ketone, diisopropyl ketone, dibutyl ketone, and diisobutyl ketone; and β-dicarbonyl compounds such as methyl acetylacetonylacetoacetate, ethyl acetoacetate, dimethyl malonate, diethyl malonate, methyl ethyl malonate, and dibenzoylmethane; and the like.

In the case that an imino group is present in a ketimine, the imino group may be reacted with, for example, styrene oxide; glycidyl ethers such as butyl glycidyl ether and allyl glycidyl ether; and glycidyl esters. These ketimine compounds may be used singly or in combination of two or more of them.

Incidentally, solvents may be mixed for improving workability and lowering viscosity, and for other purposes. Examples of the solvents to be used for the purposes include aromatic hydrocarbon solvents such as toluene and xylene; ester solvents such as ethyl acetate, butyl acetate, amyl acetate, and cellosolve acetate; ketone solvents such as methyl ethyl ketone and methyl isobutyl ketone; and the like.

In the method for preparing the composition comprising an organic polymer (a), the component (b) and the component (c) or the organic polymer (a), the component (b), the component (c) and the component (d), the component (b) and the component (c), the component (b) and the component (d), the component (b) and the component (c), and the component (d) is added and mixed one by one, and after a complete dispersion is achieved, then other component is added at the mixing with other components such as the organic polymer (a), a plasticizer, a filler, and the like. However, the component (c) and the component (d) may be added at the same time. When the component (b) and the component (c) or the component (b) and the component (d) are added at once, or the dispersion is insufficient, there is a possibility that other additives to be added in a small amount may react each other to result in a decrease of adhesiveness.

As a specific example, the component (b) and the component (c) may be added to the organic polymer (a), or the component (b), the component (c) and the component (d) may be added to the organic polymer (a) to disperse them homogeneously with optionally adjusting the stirring conditions, if needed. Alternatively, a method of mixing each component with the use of a mixer, a roll, or a kneader may be employed.

Incidentally, in the case that the curable resin composition of the invention is formed as a two-pack type, it is preferable that the components (c) and (d) are added to a main agent mainly containing the organic polymer and the component (b) to a curing agent containing a catalyst so that they do not react prior to the application.

Moreover, the composition obtained as above can be applied to not only a one-pack type but also a multipack type. A one-pack type can be obtained by preparing the composition of the invention in a substantially moisture-free state, and the resulting composition can be stored for a long period of time when it is contained in a tightly sealed state but, upon the exposure to air, it starts to cure from the surface. In the case of the multipack type, it is preferable to charge the components (c) and (d) into a container separately from the component (b) which is charged another container. Furthermore, it is more preferable to charge the component (b), the component (c) and the component (d) into individual containers.

The curable resin composition of the invention is useful as elastic sealants in buildings, construction works, industrial uses, and the like. It is also usable as paints, adhesives, injections and coatings.

EXAMPLES

The following will explain the invention in greater detail with reference to Examples, but the present invention should not be construed as being limited thereto.

Production Example 1

In a pressure-withstanding reaction vessel fitted with a stirrer was placed 500 g of polypropylene glycol (polyoxypropylene having a number average molecular weight of 11000 wherein allyl ether group was introduced into 95% of the total ends, obtainable by conducting a molecular weight jump reaction using methylene chloride starting with the one having a number average molecular weight of 2000 and capping the ends of the molecular chains with allyl chloride), and 10 g of methyldimethoxysilane was added thereto. Then, after the addition of 0.40 mL of a chloroplatinic acid catalyst solution (a solution of 8.9 g of $H_2PtCl_6 \cdot 6H_2O$ dissolved in 18 mL of isopropyl alcohol), the whole was reacted at 90° C. for 3 hours. After the removal of excessive silane under reduced pressure, a polyoxypropylene having about 1.5 $(CH_3O)_2CH_3SiCH_2CH_2CH_2O—$ groups per one molecule at the molecular ends, which was determined by quantitative analysis of silicon according to NMR method.

Synthesis Example 1

To a 300 mL flask replaced with $N_2$ was charged 50 g of N-(β-aminoethyl)-γ-aminopropyltrimethoxysilane and 50 g of γ-glycidoxypropyltrimethoxysilane, and the whole was stirred at 130° C. for 3 hours under $N_2$ stream to react them. The reaction product was a pale red liquid, and the decrease of the characteristic absorption derived from epoxy group and amino group was confirmed based on infrared absorption spectrum.

Example 1

To 100 parts by weight of polyoxypropylene (molecular weight: 18,000, Mw/Mn =1.5) having a reactive silicon group, synthesized by the method described in Synthesis Example 1 of WO Laid-Open No. 91/13928 were added 130 parts by weight of surface-treated precipitated calcium carbonate (average particle size: 0.07 µm, Trade name: Ultra Pflex, manufactured by Pfizer), 130 parts by weight of ground calcium carbonate (average particle size: 3.0 µm, Trade name: Hubercarb Q3T, manufactured by Huber), 100 parts by weight of DIDP (diisodecyl phthalate), 0.4 phr of laurylamine, 2 parts by weight of hydrogenated castor oil, 5 parts by weight of stannous octylate, and further adhesiveness-imparting agents (an amino group-substituted silane compound, an epoxy group-substituted silane compound, an epoxy resin) in amounts described in Table 1 without conducting a reaction beforehand, and the whole was thoroughly kneaded and then passed through a small three-roll paint roll to obtain a curable resin composition.

A sheet having a thickness of 3 mm was prepared by the use of the curable resin composition obtained as above, and was cured under the conditions of 23° C. and 55% RH to prepare a JIS K6301 No. 3 dumbbell, whose tensile properties were measured. Moreover, in accordance with the test method shown in ASTM C794, a test sample was prepared by the use of mortar shown in ASTM C794 and was evaluated. The judgment at break mode in the table was as follows: 90 to 100% of cohesive failure rate is marked ◎, 75 to 90% ○, and 0 to 75% X. M100 means a value of modulus at the point of 100% elongation, TB means strength at the break of dumbbell, and EB means elongation at the break of dumbbell. By the way, the adhesiveness sample was prepared without applying a primer to the adhering interface for evaluating under a severe condition.

N-(β-aminoethyl)-γ-aminopropyltrimethoxysilane (Trade name: A-1120, manufactured by Nippon Unicar) was employed as the amino group-substituted silane compound, γ-glycidoxypropyltrimethoxysilane (Trade name: A-187, manufactured by Nippon Unicar) as the epoxy group-substituted silane compound, and bisphenol A-epichlorohydrin-type epoxy resin (Trade name: Epikoto 828, manufactured by Yuka Shell Epoxy) as the epoxy resin.

Example 2

An operation as in Example 1 was conducted with the exception that the adhesiveness-imparting agents were added in amounts of the parts shown at Example 2 in Table 1.

Example 3

An operation as in Example 1 was conducted with the exception that the adhesiveness-imparting agents were added in amounts of the parts shown at Example 3 in Table 1.

Example 4

An operation as in Example 1 was conducted with the exception that allyl ether group-terminated polyoxypropylene having a number average molecular weight of 10000 wherein allyl ether group was introduced into 97% of the ends was employed instead of DIDP and the adhesiveness-imparting agents were added in amounts of the parts shown at Example 4 in Table 1.

Comparative Example 1

An operation as in Example 1 was conducted with the exception that the adhesiveness-imparting agents were used in amounts of the parts shown at Comparative Example 1 in Table 1 and a product obtained by reacting them beforehand according to the method described in Synthesis Example 1 was added.

Comparative Example 2

An operation as in Example 1 was conducted with the exception that the adhesiveness-imparting agents were used in amounts of the parts shown at Comparative Example 2 in Table 1 and a product obtained by reacting them beforehand according to the method described in Comparative Example 1 was added.

Comparative Example 3

An operation as in Example 1 was conducted with the exception that the adhesiveness-imparting agents were added in amounts of the parts shown at Comparative Example 3 in Table 1 was added.

Comparative Example 4

An operation as in Example 1 was conducted with the exception that the adhesiveness-imparting agents were added in amounts of the parts shown at Comparative Example 4 in Table 1.

Comparative Example 5

An operation as in Example 1 was conducted with the exception that the adhesiveness-imparting agents were added in amounts of the parts shown at Comparative Example 5 in Table 1.

TABLE 1

| | Unit | Ex. 1 | Ex. 2 | Ex. 3 | Ex. 4 | C. Ex. 1 | C. Ex. 2 | C. Ex. 3 | C. Ex. 4 | C. Ex. 5 |
|---|---|---|---|---|---|---|---|---|---|---|
| Amino group Substituted silane Compound*1 | part(s) by weight | 1 | 1 | 1 | 1 | 1 | 1 | 2 | | |
| Epoxy group substituted silane Compound*2 | | 2 | 1 | 2 | 2 | 2 | 2 | | 2 | |
| Epoxy resin | | | 1 | 1 | 1 | | 1 | | | 2 |
| Addition method | | added without reaction | | | | added with conducting reaction beforehand | | | | |
| Dumbbell tensile properties Adhesion ASTM C794 | M100 *3 | 0.3 | 0.3 | 0.3 | 0.3 | 0.4 | 0.4 | 0.4 | 0.3 | 0.2 |
| | TB | 1.4 | 1.4 | 1.4 | 1.4 | 1.4 | 1.4 | 1.4 | 1.2 | 1.0 |
| | EB % | 550 | 600 | 550 | 550 | 550 | 550 | 550 | 550 | 600 |
| | strength | good | good | good | good | good | good | good | no good | no good |
| | Judgment Break mode | ○ | ○ | ○ | ◎ | X | X | X | X | X |

*1 N-(β-aminoethyl)-γ-aminopropyltrimethoxysilane
*2 γ-glycidoxypropyltrimethoxysilane
*3 bisphenol A-epichlorohydrin-type epoxy resin

INDUSTRIAL APPLICABILITY

As describe above, a curable resin composition containing an organic polymer having a reactive silicon group, which is capable of exhibiting a low modulus, a high break strength, a high elongation and a good water-resistant adhesiveness to mortar, can be obtained by the combined use of an amino group-substituted silane compound and an epoxy group-substituted silane compound or an amino group-substituted silane compound, an epoxy group-substituted silane compound, and an epoxy resin.

What is claimed is:

1. A curable resin composition which comprises (a) an organic polymer having at least one reactive silicon group in one molecule, (b) an amino group-substituted silane compound, (c) an epoxy group-substituted silane compound, and (d) an epoxy resin, wherein the organic polymer (a) is at least one polymer selected from the group consisting of a hydrocarbon polymer, a polyester polymer, a graft polymer, a polysulfide polymer, a polyamide polymer, a polycarbonate polymer, a diallylphthalate polymer, and a polyoxyalkylene polymer having a repeating unit represented by the general formula (1):

$$—R^1—O—\tag{1}$$

(wherein $R^1$ represents an alkylene group).

2. The curable resin composition according to claim 1, wherein the reactive group contained in the organic polymer (a) is represented by the general formula (2):

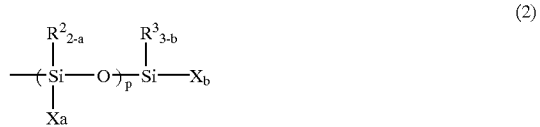
(2)

wherein $R^2$ and $R^3$ each represents an alkyl group having 1 to 20 carbon atoms, a cycloalkyl group having 3 to 20 carbon atoms, an aryl group having 6 to 20 carbon atoms, an aralkyl group having 7 to 20 carbon atoms or a triorganosiloxy group represented by $R^4{}_3SiO$— ($R^4$ is an alkyl group, a cycloalkyl group, an aryl group, or an aralkyl group similar to $R^2$ and $R^3$, and three $R^4$'s may be the same or different), and in case that two or more $R^2$'s or $R^3$'s are present, they may be same or different; X represents hydroxyl group or a hydrolyzable group, and in case that two or more X's are present, they may be the same or different; a represents 0, 1 or 2 and b represents 0, 1, 2 or 3; a's in p pieces of the general formula (3)

(3)

are not necessarily identical; p represents an integer of 0 to 19; provided that the relation: (the sum of a's)+b$\geq$1 is satisfied.

3. The curable resin according to claim 1, wherein said amino group-substituted silane compound (b) is selected from the group consisting of γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropylmethyldimethoxysilane, and 1,3-diaminoisopropyltrimethoxysilane.

4. The curable resin according to claim 1, wherein said epoxy group-substituted silane compound (c) is selected from the group consisting of γ-glycidoxypropyltrimethoxysilane and γ-glycidoxypropylmethyldimethoxysilane.

5. The curable resin according to claim 1, wherein said organic polymer (a) is a polyoxyalkylene polymer having a repeating unit represented by the general formula (1):

$$—R^1—O—\tag{1}$$

wherein $R^1$ is a linear or branched alkylene group having 2 to 4 carbon atoms.

6. The curable resin according to claim 1, wherein said epoxy resin (d) is a bisphenol A-type resin or a novolak-type resin.

7. The curable resin according to claim 1, wherein said epoxy resin (d) has at least two epoxy groups per molecule.

8. A process for producing a curable resin composition, which comprises adding independently (a) an organic polymer having at least one reactive silicon group in one molecule, (b) an amino group-substituted silane compound, (c) an epoxy group-substituted silane compound, and (d) an epoxy resin, without conducting a reaction beforehand, wherein the organic polymer (a) is at least one polymer selected from the group consisting of a hydrocarbon polymer, a polyester polymer, a graft polymer, a polysulfide polymer, a polyamide polymer, a polycarbonate polymer, a diallylphthalate polymer, and a polyoxyalkylene polymer having a repeating unit represented by the general formula (1):

$$—R^1—O—\tag{1}$$

(wherein $R^1$ represents an alkylene group).

* * * * *